United States Patent
Kim et al.

(10) Patent No.: US 10,748,021 B2
(45) Date of Patent: Aug. 18, 2020

(54) METHOD OF ANALYZING OBJECTS IN IMAGES RECORDED BY A CAMERA OF A HEAD MOUNTED DEVICE

(71) Applicants: Hyejung Kim, Murphy, TX (US); Hideo Tamama, Allen, TX (US); Seok-Jun Lee, Allen, TX (US); Injoon Hong, Plano, TX (US)

(72) Inventors: Hyejung Kim, Murphy, TX (US); Hideo Tamama, Allen, TX (US); Seok-Jun Lee, Allen, TX (US); Injoon Hong, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 85 days.

(21) Appl. No.: 15/977,236

(22) Filed: May 11, 2018

(65) Prior Publication Data

US 2019/0347501 A1  Nov. 14, 2019

(51) Int. Cl.
| | |
|---|---|
| G06K 9/20 | (2006.01) |
| G06K 9/32 | (2006.01) |
| G06N 3/08 | (2006.01) |
| G06F 3/01 | (2006.01) |
| G06K 9/62 | (2006.01) |
| G06K 9/00 | (2006.01) |

(52) U.S. Cl.
CPC ........... *G06K 9/2054* (2013.01); *G06F 3/013* (2013.01); *G06K 9/00671* (2013.01); *G06K 9/3233* (2013.01); *G06K 9/6261* (2013.01); *G06N 3/08* (2013.01)

(58) Field of Classification Search
CPC ............. G06K 9/00771; G06K 9/4628; G06K 9/00288; G06T 2207/10016
USPC .................. 382/103, 106, 113, 156, 181, 282
See application file for complete search history.

(56) References Cited

U.S. PATENT DOCUMENTS

| | | |
|---|---|---|
| 8,532,414 B2 | 9/2013 | Wang et al. |
| 9,035,970 B2 | 5/2015 | Lamb |
| 9,323,325 B2 | 4/2016 | Perez |
| 9,360,935 B2 | 6/2016 | Chan |
| 9,423,619 B2 | 8/2016 | Kim |

(Continued)

FOREIGN PATENT DOCUMENTS

| | | |
|---|---|---|
| KR | 20170106823 | 9/2017 |
| WO | 2014085757 | 6/2014 |
| WO | 2015142966 | 9/2015 |

OTHER PUBLICATIONS

Toyama et al., Gaze Guided Object Recognition Using a Head-Mounted Eye Tracker, 2017.

(Continued)

*Primary Examiner* — Sam Bhattacharya
(74) *Attorney, Agent, or Firm* — John J. King

(57) ABSTRACT

A method of analyzing objects in images recorded by a camera of a head mounted device is disclosed. The method comprises performing eye tracking while recording the images; determining a region of interest of an image based upon the eye tracking; generating a bounding box based upon the region of interest; cropping an image based upon the bounding box to generate a cropped image; performing a fine cropping of the cropped image; and detecting an object in the cropped image. An electronic device for analyzing objects in images recorded by a camera of a head mounted device is also disclosed.

19 Claims, 5 Drawing Sheets

(56) References Cited

U.S. PATENT DOCUMENTS

| | | |
|---|---|---|
| 9,542,996 B2 | 1/2017 | Thomas |
| 9,875,418 B2 | 1/2018 | Hwang |
| 2014/0064578 A1 | 3/2014 | Choe |
| 2015/0160461 A1 | 6/2015 | Starner |
| 2015/0261295 A1 | 9/2015 | Lee |
| 2016/0248995 A1 | 8/2016 | Mullins |
| 2017/0038837 A1 | 2/2017 | Faaborg |
| 2017/0113702 A1 | 4/2017 | Thieberger-Navon |
| 2017/0168709 A1 | 6/2017 | Zhong et al. |
| 2017/0200279 A1* | 7/2017 | Zhong .................. G06T 7/215 |
| 2018/0068640 A1* | 3/2018 | Martin .................. G06F 3/013 |
| 2019/0147602 A1* | 5/2019 | Tao ....................... G06T 7/248 |
| | | 382/103 |

OTHER PUBLICATIONS

Karthikeyan Shanmuga Vadivel, Modeling Eye Tracking Data with Application to Object Detection, Dec. 2014.

Socher et al, Convolutional-Recursive Deep Learning for 3D Object Clasification, 2017.

Papadopoulos et al., Training object class detectors from eye tracking data, School of Informatics, University of Edinburgh, 2017.

\* cited by examiner

METHOD OF ANALYZING OBJECTS IN IMAGES RECORDED BY A CAMERA OF A HEAD MOUNTED DEVICE

FIELD OF THE INVENTION

An embodiment of the invention relates generally to devices that capture images, and in particular, to a method of analyzing images recorded by a camera of a head mounted device.

BACKGROUND OF THE INVENTION

Object detection using images captured by an electronic device can have many practical applications. Object detection can require significant computational resources and may take considerable time. For object detection to be useful, it may necessary that an object is identified within a certain time period. However, many portable electronic devices may not have the computational resources to provide information related to objects to a user of the device in a reasonable amount of time.

Head-Mounted-Display (HMD) wearable devices have many emerging applications. Useful features to enable such applications for an HMD include object detection, recognition, and tracking and showing the result on display. In order to have good user experience, high accuracy and fast response time with respect to user's movement and/or object's movement are generally required for object detection, recognition, and tracking.

Accordingly, there is a need for improved accuracy and response speed for object detection.

SUMMARY OF THE INVENTION

A method of analyzing objects in images recorded by a camera of a head mounted device is disclosed. The method comprises performing eye tracking while recording the images; determining a region of interest of an image based upon the eye tracking; generating a bounding box based upon the region of interest; cropping an image based upon the bounding box to generate a cropped image; performing a fine cropping of the cropped image; and detecting an object in the cropped image.

Another method of analyzing objects in images recorded by a camera of a head mounted device comprises performing eye tracking while recording the images; determining a region of interest of an image based upon the eye tracking; generating a bounding box based upon a center of the region of interest and depth information associated with objects in the image; cropping the image based upon the bounding box to generate a cropped image; and detecting an object in the cropped image.

An electronic device for analyzing objects in images recorded by a camera of a head mounted device is also disclosed. The electronic device comprises a processor coupled to receive images captured by the camera, wherein the processor: performs eye tracking while recording the images; determines a region of interest of an image based upon the eye tracking; generates a bounding box based upon the region of interest; crops an image based upon the bounding box to generate a cropped image; performs a fine cropping of the cropped image; and detects an object in the cropped image.

DETAILED DESCRIPTION OF THE DRAWINGS

The circuits and methods set forth below take a Region-Of-Interest (ROI) area out of large image input for accurate and less computation object detection and recognition for Wearable HMD device. Eye-tracking is used, such as with a Wearable HMD device to obtain a region of interest. For given eye-tracking point in Wearable HDM device, ROI input for deep-learning engine is identified so that peripheral areas are not computed, and hence power consumption is reduced for object tracking while maintaining object detection/recognition accuracy. Improved object detection may reduce the latency of head-motion to object detection/recognition in Wearable HMD device.

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

Figure 1:
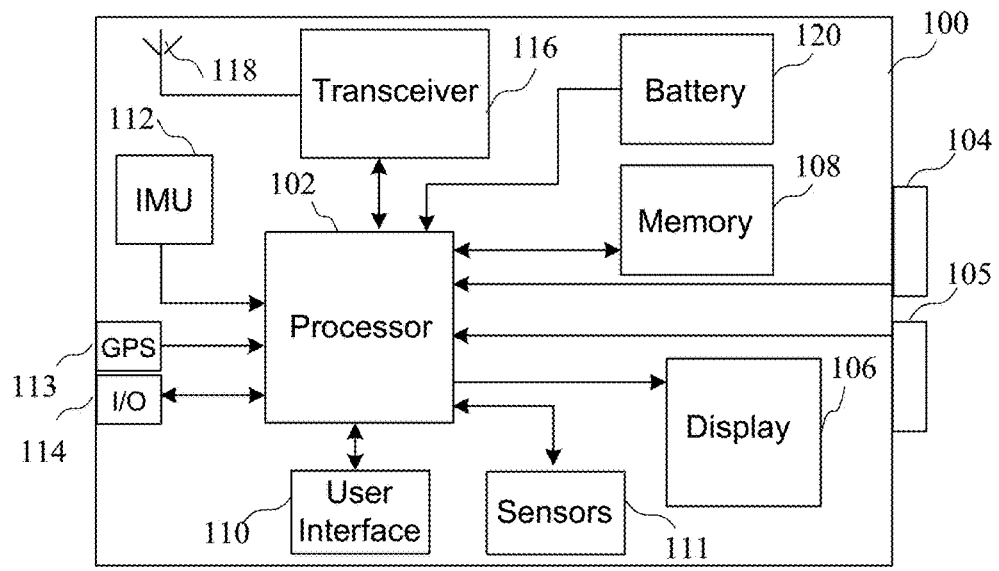
FIG. 1 is an exemplary block diagram of an electronic device having multiple cameras.

Turning first to FIG. 1, a block diagram of an electronic device having multiple cameras is shown. The exemplary electronic device 100 that may be any type of device having multiple cameras. The electronic device 100 may comprise a processor 102 coupled to a plurality of cameras 104 and 105. While cameras 104 and 105 are shown, it should be understood that the cameras comprise image recording devices, such as image sensors, and that the cameras may be independent of each other or may share circuitry. The cameras may a part of an HMD, where one camera may be used for providing a view of a scene and the other may be used for performing eye tracking (i.e. the movement and viewing direction) of the eyes of a user of the HMD, as will be described in more detail below. The mobile device 100 could be any type of device adapted to transmit and receive information, such as a smart phone, tablet or other electronic device receiving or providing information, such as a wearable device. The processor 102 is an integrated electronic circuit such as, for example, an ARM processor, an X86 processor, a MIPS processor, a graphics processing unit (GPU), a general purpose GPU, or any other processor configured to execute instructions stored in a memory. The processor 102 could be implemented in one or more processing devices, where the processors may be different. For example, the electronic device could include a central processing unit (CPU) as well as a GPU for example.

The processor 102 may be coupled to a display 106 for displaying information to a user. The processor 102 may also be coupled to a memory 108 that allows storing information related to data or information associated with achieving a goal. The memory 108 could be implemented as a part of the processor 102, or could be implemented in addition to any cache memory of the processor, as is well known. The memory 108 could include any type of memory, such as a solid state drive (SSD), Flash memory, Read Only Memory (ROM) or any other memory element that provides long term memory, where the memory could be any type of internal memory of the electronic device or external memory accessible by the electronic device.

A user interface 110 is also provided to enable a user to both input data and receive data. Some activity tracking may require user's manual input. The user interface could include a touch screen user interface commonly used on a portable communication device, such as a smart phone, smart watch or tablet computer, and other input/output (I/O) elements, such as a speaker and a microphone. The user interface could also comprise devices for inputting or outputting data that could be attached to the mobile device by way of an electrical connector, or by way of a wireless connection, such as a Bluetooth or a Near Field Communication (NFC) connection.

The processor 102 may also be coupled to other elements that receive input data or provide data, including various sensors 111, an inertial measurement unit (IMU) 112 and a Global Positioning System (GPS) device 113 for activity tracking. For example, an inertial measurement unit (IMU) 112 can provide various information related to the motion or orientation of the device, while GPS 113 provides location information associated with the device. The sensors, which may be a part of or coupled to a mobile device, may include by way of example a light intensity (e.g. ambient light or UV light) sensor, a proximity sensor, an environmental temperature sensor, a humidity sensor, a heart rate detection sensor, a galvanic skin response sensor, a skin temperature sensor, a barometer, a speedometer, an altimeter, a magnetometer, a hall sensor, a gyroscope, WiFi transceiver, or any other sensor that may provide information related to achieving a goal. The processor 102 may receive input data by way of an input/output (I/O) port 114 or a transceiver 116 coupled to an antenna 118.

Figure 2:
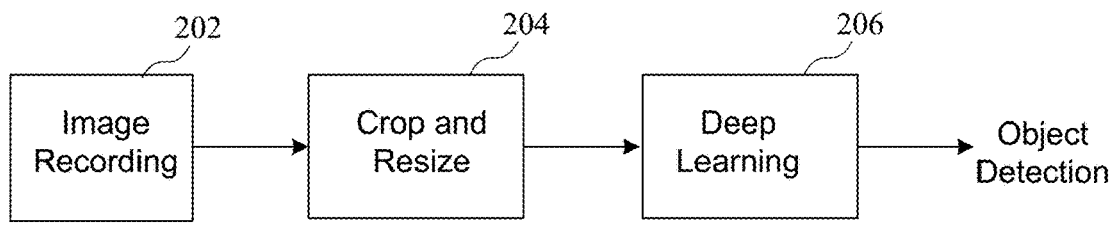
FIG. 2 is an exemplary diagram showing a process of identifying objects associated with images captured by an image recording device.

Turning now to FIG. 2, an exemplary diagram showing a process of identifying objects associated with images captured by an image recording device, such as a camera. According to one embodiment of the invention, object detection is performed by identifying one or more relevant areas of an image, and performing object detection on those one or more relevant areas rather than the entire image. As shown in FIG. 2, an image recording circuit 202, which may be one of the cameras of FIG. 1 for example, is used to record an image that is provided to a crop and resize block 204 to crop the image to a smaller area of the original image and to have relevant areas of the original image. For example, given 12M-pixel camera without cropping the image, it will take a few minutes to detect objects on flagship smartphone. As will be described in more detail below, both coarse cropping and fine cropping can reduce the complexity and time to perform object detection.

In order to have natural display without any awkwardness to human's eyes, a minimum frame rate for a display should be 30 frames per second (fps). To provide 1 object detection per every frame at 30 fps, all the image processing including object detection/recognition should be completed within 33 msec. Hence, it should be determined how to provide a region-of-interest (ROI) to deep-learning engine for object detection/recognition to reduce the processing time while keeping high accuracy. The cropping and resizing could be performed by a processor of an electronic device recording the image, such as the processor 102 of the electronic device 100 for example. The cropped image may also be resized to provide greater resolution for the cropped area, and even fine cropped, as will be described in more detail below.

The cropped image is then provided to a deep learning block 206. The deep learning block 206 performs deep learning that, unlike task-specific processing, makes decisions or provides outputs based upon the relationship between various detected stimuli or conditions. Deep learning can be used in object detection to not only identify particular objects based upon other objects in a scene, but to also determine the relevance of a particular object in a scene or the relationship between different objects in the scene. According to some embodiments, the deep learning could be performed on the electronic device recording images. A deep-learning network can provide various object detection/recognition functionality by updating a new set of network parameters. But a deep-learning network has high computational complexity which requires a lot of resources such as processing time, and power consumption. By cropping image, the deep learning could be performed on the electronic device. That is, because the cropped image is not only smaller but has fewer objects for object detection, the deep learning may require less processing resources and therefore can be performed on the electronic device itself. It should be noted that the deep learning could be performed remotely. For example, the deep learning associated with a cropped image could be sent to a remote computer, such as to a cloud computer bank by a wireless connection for example. Object identification information related to the cropped image could be provided back to the electronic device.

Figure 3:
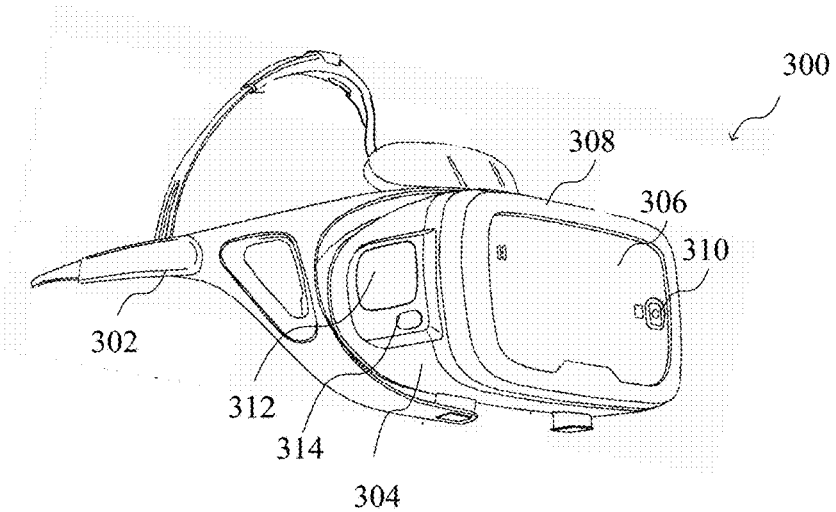
FIG. 3 is an exemplary diagram of a head mounted device that could be used to implement the method of analyzing objects in images recorded by a camera of the head mounted device.

Turning now to FIG. 3, an exemplary diagram of a head mounted device that could be used to implement the method of analyzing objects in images recorded by a camera of the head mounted device is shown. The head-mounted electronic device 300 of FIG. 3 comprises a head mounting element 302 enabling securing a control unit 304 to a user's head. The head mounting element could include straps, adjustable head bands, or attachment members that enable securing the HMD to a user's head. The control unit 304 is configured to provide a visual experience on a screen viewed by a user wearing the head-mounted electronic device 300. According to some embodiments, some elements of the head-mounted device may be implemented in a portable electronic device 306, such as a display of a smart phone for example. That is, the elements necessary to implement the circuits and methods set forth below can be implemented in a control unit 304 of the head-mounted electronic device, in the portable electronic device 306, or distributed between the control unit 304 of the head-mounted electronic device and the portable electronic device 306. According to other embodiments, the elements associated with the circuits and methods are implemented in the control unit of an integrated head mounted device that does not require a portable electronic device 306. While a HMD that covers the eyes is shown by way of example, it should be understood that other types of HMDs could be used, such as HMDs that more closely resemble conventional glasses for example.

An attachment element 308 may be used to secure the portable electronic device 306 to the control unit 304. The attachment element 308 may include a connector mechanism (e.g., microUSB, USB type C, lightning connector, etc.). The attachment element may further include a mechanism to hold the portable electronic device to the HMD. Examples of such mechanisms may include clips, clamps, removable covers, etc. The portable electronic device could be for example a smart phone or other type of wireless communication device having a display. A camera 310, which may be a part of the portable electronic device 306, allows the head-mounted electronic device to function as a virtual reality (VR) device or an augmented reality (AR) device using the camera to pass-through images of the surrounding environment. A second camera or other eye tracking sensor may be employed inside the HMD to perform eye tracking. The HMD may also comprise user interface elements, shown here as a track pad 312 and a control button 314, which may enable a selection operation that depends upon the mode of operation of the HMD.

While an electronic device having a display viewable by a user is shown in FIG. 3 as a head-mounted electronic device, it should be understood that the circuits and elements set forth below could be implemented in an electronic device that does not need to be mounted to the head, but can be held in the hand of the user to provide a visual experience, which may be a VR or an AR experience for examples, to a user. Such a device could be a stand-alone device or could have a portable electronic device such as a smartphone.

Figure 4:
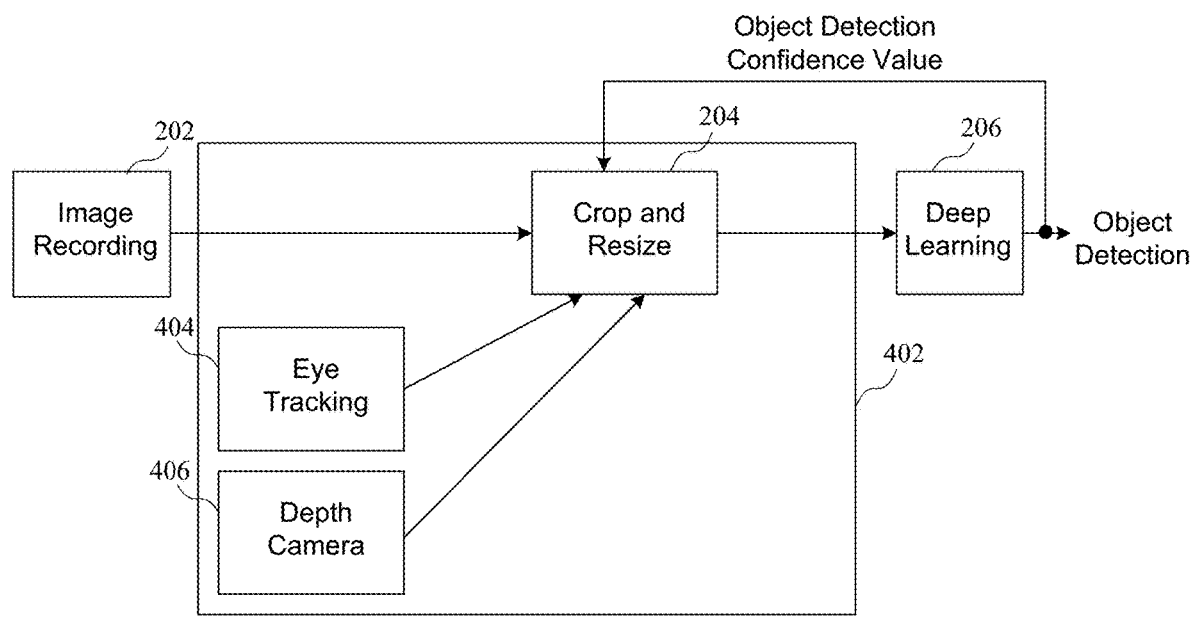
FIG. 4 is an exemplary block diagram showing object detection using a head mounted device.
Figure 7:
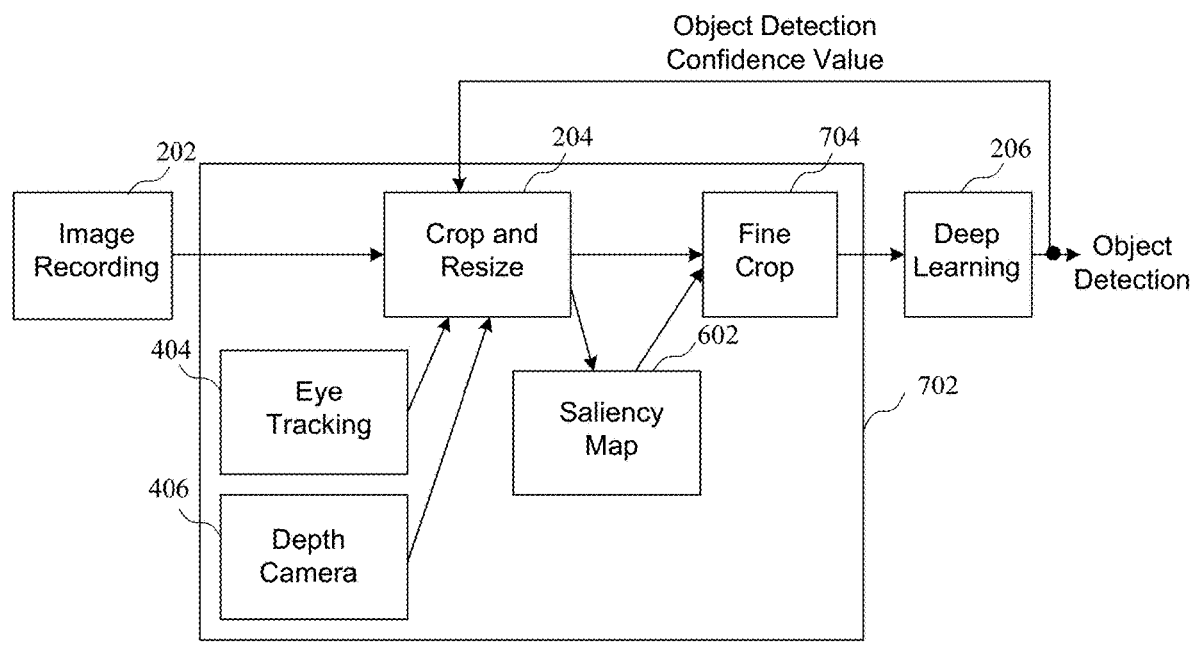
FIG. 7 is another exemplary block diagram showing object detection using a head mounted device.

Turning now to FIG. 4, an exemplary block diagram shows object detection using a head mounted device. According to the implementation of FIG. 4, the image recording circuit 202 is coupled to an image processing circuit 402 having the crop and resize block 204, and further comprising an eye tracking block 404 and a depth camera block 406. The eye tracking block 404 allows for identifying a location where a user of the HMD is looking, which may be represented by X and Y coordinates for example. The X and Y coordinates may be used to position a bounding box used for cropping the image. The bounding box is, for example, a border that encloses one or more objects in an image. According to some implementations, the bounding box may be determined based upon 40 degrees of a field of view, where a person's normal field of view is approximately 120 degrees based upon a gaze of the user of the HMD. According to other embodiments, the depth camera block 406 may be used to determine depth in the image, which may be represented by a Z coordinate. The depth camera block 406 may also be used to determine a size of a bounding box, as will be described in more detail below in reference to FIG. 7.

In order to increase accuracy and performance of object detection by an electronic device, a first high-resolution input image is required. If a target resolution of 1° among 70° of human eye's view angle is desired, a full input image size could be selected to be a minimum 4M pixel. That is, a minimum object size for object detection network should be 32×32 pixel block, where an advance object detection/recognition processing may be required. Further, deep-learning network are beneficial for object detection due to its flexibility, high accuracy performance, simultaneous multi-object detection features.

The crop and resize block 204 receives recorded images, as well as eye tracking information from the eye tracking block 404 and depth information from the depth camera block 406, to determine a how to crop an image. The crop and resize block 204 may resize the cropped image to provide greater resolution for the cropped image. That is, the cropped image may be presented having a number of pixels as in the original image but for a smaller portion of the original image. The cropped image is provided to the deep learning block 206 to generate object detection information. An object detection confidence value may also be feed back to the crop and resize block 204. The object detection confidence value provides a confidence level associated with the object detection that can be used in future cropping or re-cropping to provide better object detection. For example, as a user wearing an HMD continues to track object, the crop and resize block 204 may determine that the user is gazing at another object based upon the object detection confidence value, and crop the image differently. The deep learning block 206 may then generate different object detection information. A new object detection configuration value may provide a different confidence level, and therefore affect future cropping based upon new eye tracking and depth information. The tracking of the cropping region can be performed, the selection of a number of frames that are tracked, and an updating of a region of interest can be performed based upon different factors, including for example, the speed of the camera, the processing latency for saliency map generation, a time required for determining a gaze of a user of the HMD, and required accuracy for object detection.

Figure 5:
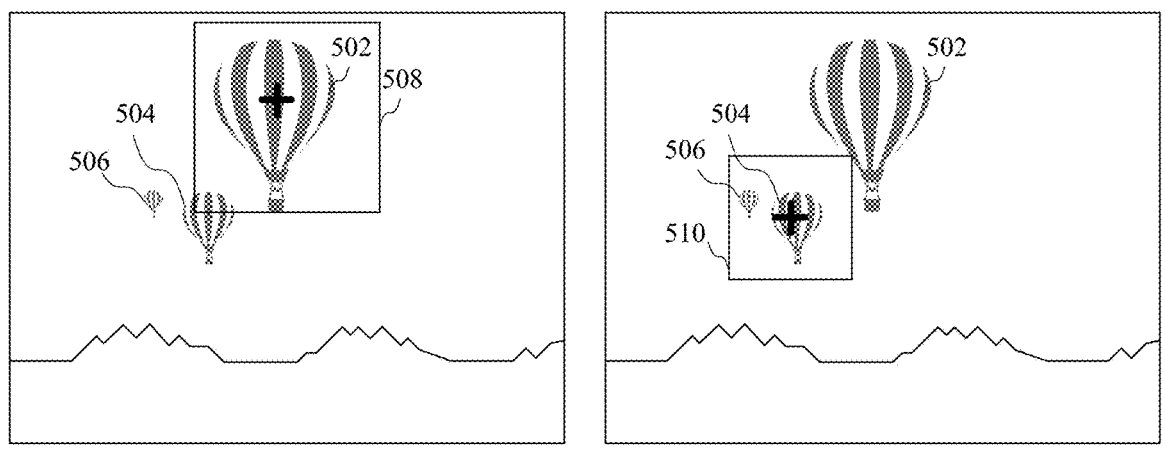
FIG. 5 shows examples of bounding boxes selected to identify a region of interest (ROI) of an image.

Turning now to FIG. 5, examples of bounding boxes selected to identify a region of interest (ROI) of an image are shown. Each of the images shown the same scene including three hot air balloons 502-506 over a mountain range. As shown in the image on the left, a bounding box 508 includes the near hot air balloon 502 and portion of the hot air balloon 504 that is behind the hot air balloon 502, but closer than the hot air balloon 506. A center of the bounding box is designated by the cross in the image. The center of the bounding box may be determined by the eye tracking block 404 for example. The size of the bounding box may be determined based upon determined depth information for example. After an image is cropped, the location of the center of the bounding box and the size of the bounding box may be changed as will be described in more detail in reference to FIG. 6.

As shown in the image on the right, a smaller bounding box is implemented and includes the hot air balloon 504 and the hot air balloon 506, which is in the distance. The selection of the bounding box 510 may be based upon eye tracking information that indicates that the user is following the more distant hot air balloons. The bounding box 510 is also smaller because smaller objects (i.e. more distant objects) are being tracked.

Depth information of an object can be obtained from depth camera input, and depth information of a detected gaze point by intersection of left and right eye tracking information. Depth information associated with different objects where a user is focusing can be extracted. The use of depth information can be beneficial when two objects overlap each other. For example, if object 1 and object 2 are overlapping or very near each other and a user can see around the overlap point, it may be difficult to know what objects that the user is focusing on without depth information. However, gaze depth information gives more detailed information of where the user is focusing, and the object recognition boundary can be extracted.

Figure 6:
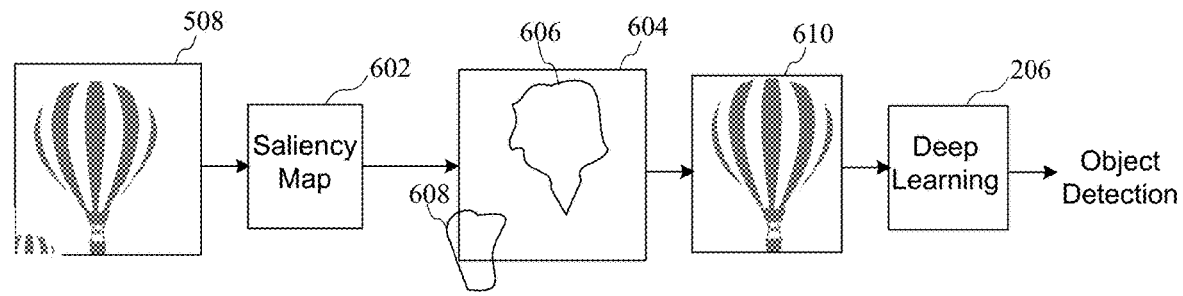
FIG. 6 is an exemplary diagram showing the use of a saliency may to identify an object in a ROI.

Turning now to FIG. 6, an exemplary diagram shows the use of a saliency may to identify an object in a ROI. Using the cropped image from the bounding box 508, a saliency map 602 is used to allow for fine cropping of the coarse cropped image. A fine cropping is, for example, the removal of outer areas so as to bring to center the object that is the focus of the user. A saliency map generally simplifies an image to make it easier to analyze. As shown in FIG. 6, an output 604 of the saliency map comprises a first blob 606 representative of the hot air balloon 502 and a second blob 608 representative of the hot air balloon 504. Based upon the size and location of the blobs 606 and 608, it can be determined that the hot air balloon 504 represented by the first blob 606 is the focus of the user, and therefore a fine cropping should be performed to generate a fine cropped image 610 that is centered on the hot air balloon 502, which substantially fills the cropped image 610. The fine cropping can be performed by an image processing circuit 702 having a fine cropping block 704 that determines when to crop an image based upon the saliency map. The deep learning block 206 then generates object detection information based upon the fine cropped image. By performing a coarse cropping based upon eye tracking and depth information, and performing a fine tracking based upon a saliency map, object detection having a higher confidence value can be achieved.

Figure 8:
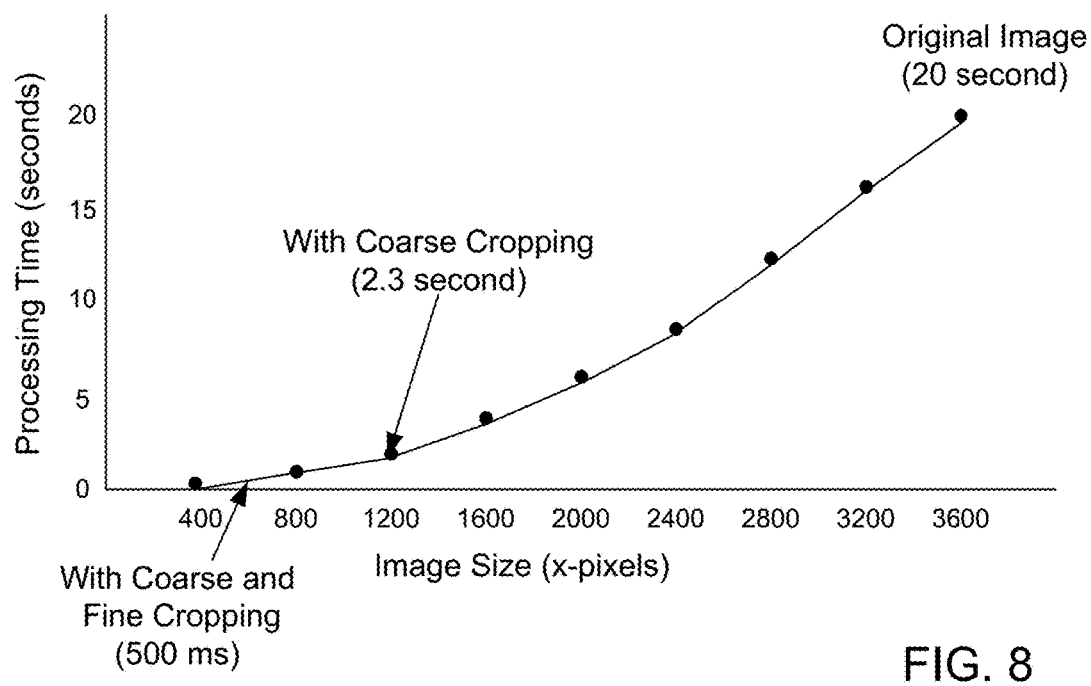
FIG. 8 is a graph showing improvements in object identification using cropping.

Turning now to FIG. 8, a graph shows improvements in object identification using cropping as set forth above. Processing times for object detection performed on a mobile platform implementing aspects of the method of analyzing recorded images as set forth above were determined, where the mobile platform comprised a 265-bit processor having a 16 bit multiply/accumulate unit (MAC) operating at 533 MHz, 1.2 MB internal SRAM, and a 2 GB DMA bandwidth limit. As shown in FIG. 8, it took 20 seconds to perform object detection using an original 12M pixel image without any cropping. However, by using both coarse cropping and fine cropping, the amount of time necessary to perform object tracking is significantly reduced. For example, with coarse cropping as described above, object identification in the coarse cropped image only required 2.3 seconds. With both coarse and fine cropping as described above, object identification only required 500 milliseconds.

Figure 9:
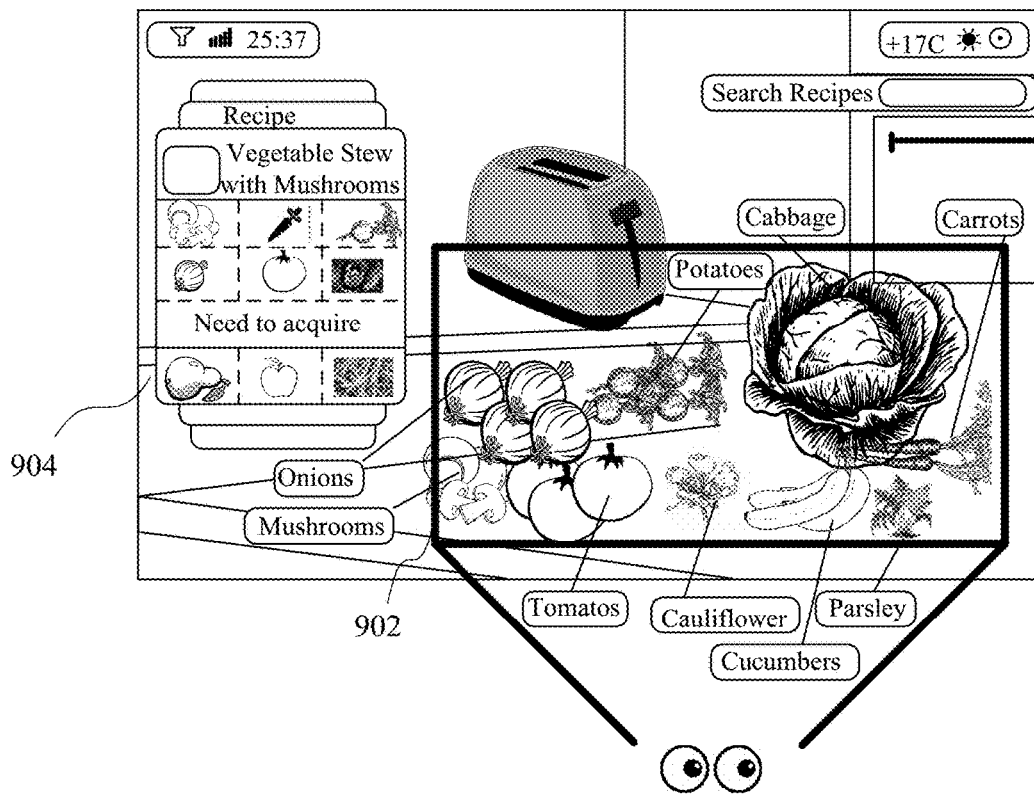
FIG. 9 is an exemplary diagram showing an application of a method of analyzing images recorded by a camera of a head mounted device.

Turning now to FIG. 9, an exemplary diagram shows an application of a method of analyzing images recorded by a camera of a head mounted device. As shown in FIG. 8, a plurality of food items shown in a bounding box 802 are detected in an image. The bounding box 902 may be determined based upon eye tracking and depth information as described above. The application may then present a recipe 904 that includes the items identified in the bounding box for example.

Figure 10:
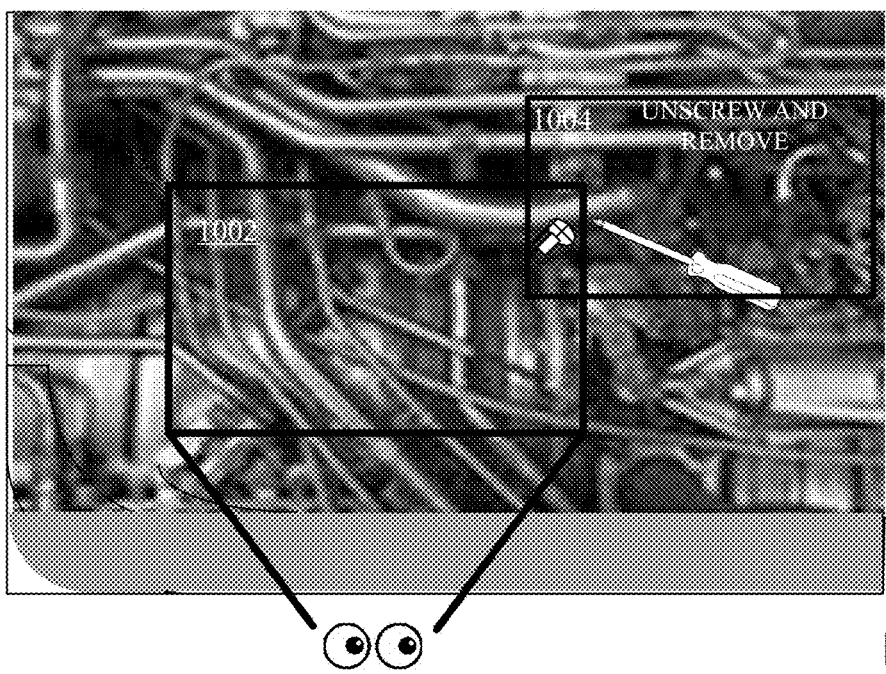
FIG. 10 is an exemplary diagram showing another application of a method of analyzing images recorded by a camera of a head mounted device.

Turning now to FIG. 10, an exemplary diagram shows another application of a method of analyzing images recorded by a camera of a head mounted device. According to the example of FIG. 10, a bounding box 1002 comprises a section of an automobile engine that is being worked on by a technician. An instruction 1004 can be presented to the technician to allow the technician to make an appropriate repair. It should be noted that the applications of FIGS. 9 and 10 could be implemented using an HMD as described above.

Figure 11:
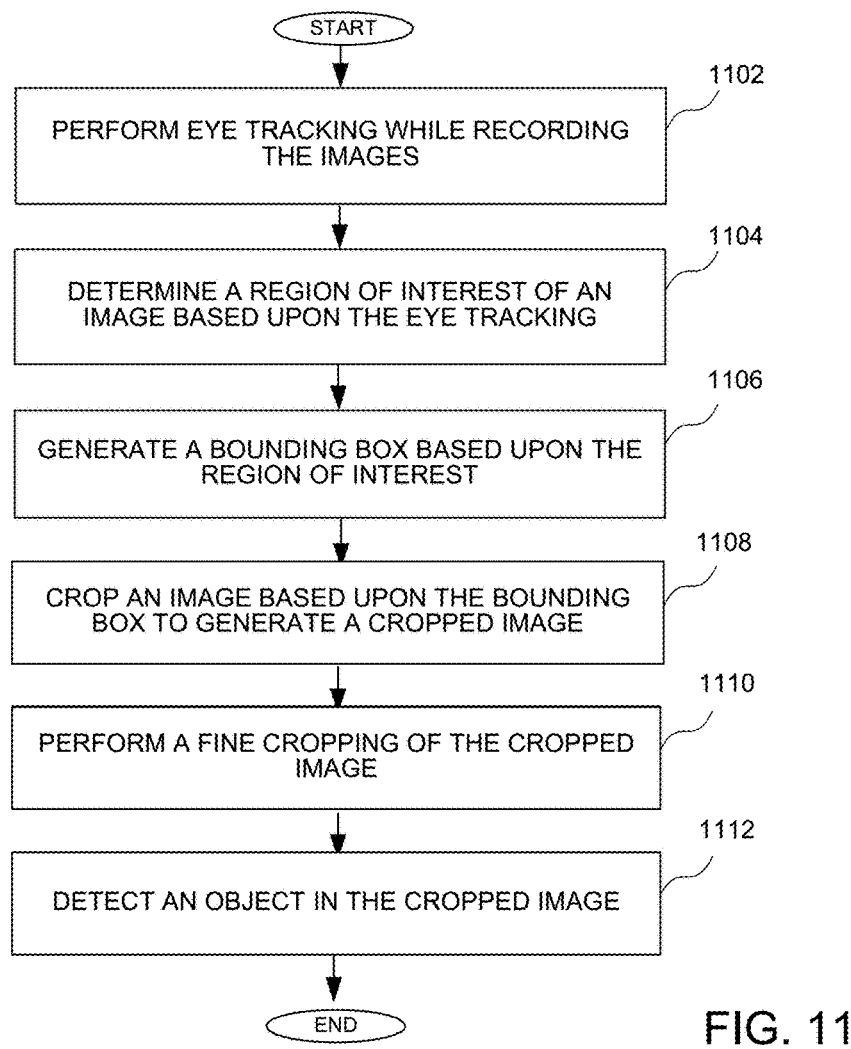
FIG. 11 is an exemplary flow diagram showing a method of analyzing images recorded by a camera of a head mounted device.

Turning now to FIG. 11, an exemplary flow diagram shows a method of analyzing images recorded by a camera of a head mounted device. In particular, eye tracking while recording images is performed at a block 1102. A region of interest of an image based upon the eye tracking is determined at a block 1104. A bounding box is generated based upon the region of interest at a block 1106. The size of the bounding box may also be generated based upon depth information associated with objects in the image. An image is then cropped based upon the bounding box to generate a cropped image at a block 1108. A fine cropping of the cropped image may then be performed at a block 1110. The coarse and fine cropping may be performed as described above using the circuit of FIG. 7 for example. An object in the cropped image is detected at a block 1112

According to some embodiments of the method of FIG. 11, detecting an object in the cropped image may comprise performing deep learning. The method may further comprise generating an object detection confidence value associated with an object in the image, and using the object detection confidence value to determine a region of interest of a later image. Performing a fine cropping may comprise using a saliency map to identify an updated region of interest. Determining a region of interest of an image based upon the eye tracking may comprise using a predetermined angle associated with a field of view of the head mounted device. Also, generating a bounding box may comprise using detected depths of objects in the image, wherein a center the bounding box is determined based upon a center of the region of interest and a size of a bounding box is determined based upon the detected depths.

The various elements of the methods of FIG. 11 may be implemented using the circuits of FIGS. 1-7 as described, or using some other suitable circuits. While specific elements of the method are described, it should be understood that additional elements of the method, or additional details related to the elements, could be implemented according to the disclosure of FIGS. 1-10.

It can therefore be appreciated that new circuits for and methods of analyzing objects in images recorded by a camera of a head mounted device have been described. It will be appreciated by those skilled in the art that numerous alternatives and equivalents will be seen to exist that incorporate the disclosed invention. As a result, the invention is not to be limited by the foregoing implementations, but only by the following claims.

We claim:

1. A method of analyzing objects in images recorded by a camera of a head mounted device, the method comprising:
   performing eye tracking while recording the images;
   determining a region of interest of an image based upon the eye tracking;
   generating a bounding box based upon the region of interest;
   cropping an image based upon the bounding box to generate a cropped image;
   performing a fine cropping of the cropped image to generate an updated region of interest; and
   detecting an object in the cropped image after the fine cropping.

2. The method of claim 1, wherein detecting an object in the cropped image comprises performing deep learning.

3. The method of claim 2, further comprising generating an object detection confidence value associated with the object in the image, and using the object detection confidence value to determine a region of interest of a later image.

4. The method of claim 1, wherein performing a fine cropping of the cropped image comprises using a saliency map to identify the updated region of interest.

5. The method of claim 1, wherein determining a region of interest of an image based upon the eye tracking comprises identifying the region of interest using a predetermined angle associated with a field of view of the head mounted device.

6. The method of claim 1, wherein generating a bounding box comprises using detected depths of objects in the image.

7. The method of claim 6, wherein a center the bounding box is determined based upon a center of the region of interest and a size of a bounding box is determined based upon the detected depths of objects in the image.

8. A method of analyzing objects in images recorded by a camera of a head mounted device, the method comprising:
performing eye tracking while recording the images;
determining a region of interest of an image based upon the eye tracking;
generating a bounding box based upon a center of the region of interest and depth information associated with objects in the image, wherein a size of the bounding box is determined by the depth information;
cropping an image based upon the bounding box to generate a cropped image; and
detecting an object in the cropped image.

9. The method of claim 8, wherein detecting an object in the cropped image comprises performing deep learning.

10. The method of claim 9, further comprising generating an object detection confidence value associated with an object in the image, and using the object detection confidence value to determine a region of interest of a later image.

11. The method of claim 8, further comprising performing fine cropping of the cropped image using a saliency map to identify an updated region of interest.

12. The method of claim 8, further comprising detecting depths of objects in the image.

13. An electronic device for analyzing objects in images recorded by a camera of a head mounted device, the electronic device comprising:
a processor coupled to receive images captured by the camera, wherein the processor:
performs eye tracking while recording the images;
determines a region of interest of an image based upon the eye tracking;
generates a bounding box based upon the region of interest;
crops an image based upon the bounding box to generate a cropped image;
performs a fine cropping of the cropped image to generate an updated region of interest; and
detects an object in the cropped image after the fine cropping.

14. The electronic device of claim 13, wherein detecting an object in the cropped image comprises performing deep learning.

15. The electronic device of claim 14, wherein the processor further generates an object detection confidence value associated with the object in the image, and uses the object detection confidence value to determine a region of interest of a later image.

16. The electronic device of claim 13, wherein performing a fine cropping of the cropped image comprises using a saliency map to identify the updated region of interest.

17. The electronic device of claim 13, wherein determining a region of interest of an image based upon the eye tracking comprises identifying the region of interest using a predetermined angle associated with a field of view of the head mounted device.

18. The electronic device of claim 13, wherein generating a bounding box comprises using detected depths of objects in the image.

19. The electronic device of claim 18, wherein the processor further determines a center the bounding box based upon a center of the region of interest and determines a size of a bounding box based upon the detected depths of objections in the image..

* * * * *